No. 862,362. PATENTED AUG. 6, 1907.
O. H. WEICHEL.
CAMERA MAGAZINE.
APPLICATION FILED JUNE 4, 1906.
2 SHEETS—SHEET 2.
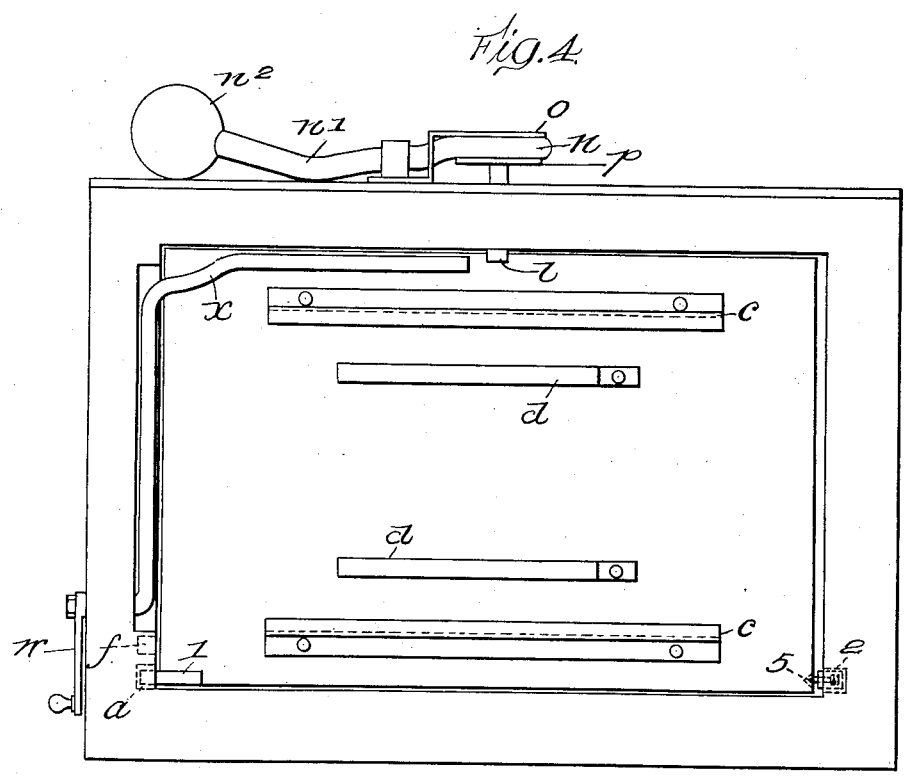
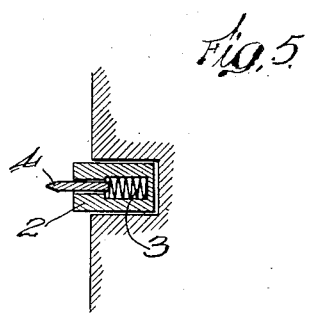

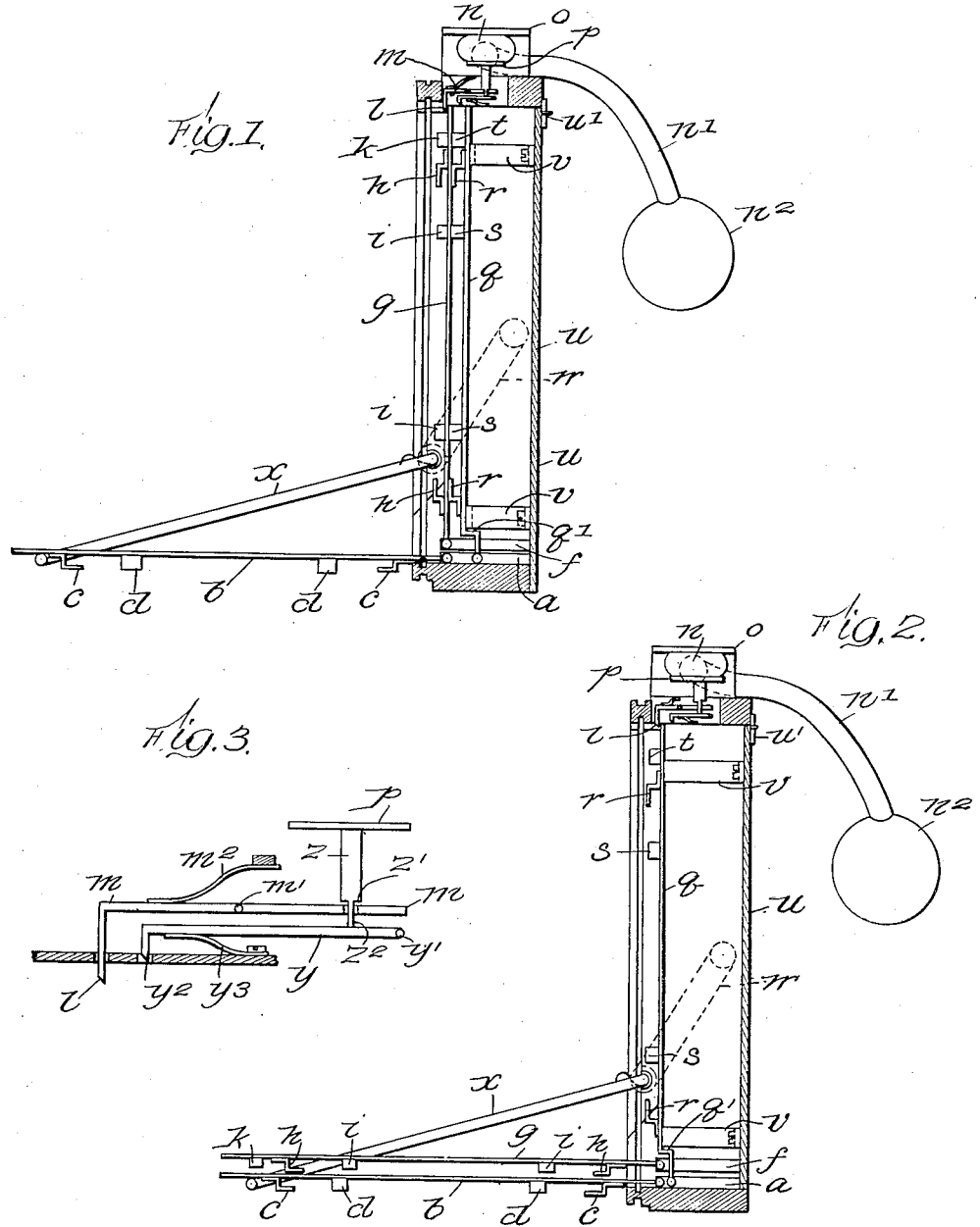

UNITED STATES PATENT OFFICE.

OTTO HERMANN WEICHEL, OF BERLIN, GERMANY, ASSIGNOR TO THE FIRM OF MAX HECKELMANN, OF BERLIN, GERMANY.

CAMERA-MAGAZINE.

No. 862,362.　　　　　　Specification of Letters Patent.　　　　　　Patented Aug. 6, 1907.

Application filed June 4, 1906. Serial No. 320,198.

*To all whom it may concern:*

Be it known that I, OTTO HERMANN WEICHEL, a subject of the Emperor of Germany, residing at Berlin, Germany, have invented a new and useful Improvement in Camera-Magazines, of which the following is a specification.

This invention relates to an improved magazine camera designed for three-color photographic work and has for its object the provision of an improved magazine and also improved plate holders therefor together with means for respectively inserting, retaining and releasing the plate holders when the magazine is in use.

The invention will be more fully described in connection with the accompanying drawings and will be more particularly pointed out in and by the appended claims.

In the drawings: Figure 1 is a vertical section of a magazine embodying the main features of my invention in which there are arranged three plate holders, one behind the other, the forward plate holder being shown in an exposed position and the remaining plate holders being shown in an unexposed position. Fig. 2 is a similar view showing the second plate holder in an exposed position and the third holder in an unexposed position. Fig. 3 is an enlarged sectional view illustrating a combined releasing and retaining device for the plate holders. Fig. 4 is a front elevation of the magazine showing the plate holders in exposing positions. Fig. 5 is a detail sectional view of one form of pivotal mounting for the plate holders.

Like characters of reference designate similar parts throughout the different figures of the drawings.

As shown the magazine comprises a rectangular structure open at its forward side and provided at its forward margins with grooves adapted for engagement with suitable devices whereby said magazine may be removably secured in place to the camera in any desirable manner. The rear wall $u$ of the magazine is adapted to be removed or opened to permit insertion of the plate holders and is preferably hinged to the upper wall of the magazine at $u'$. Magazine springs $v$ are secured to the wall $u$ in a manner to engage the plate holders at their rear sides and force the same into a forward position in the magazine. The side walls of the magazine are provided with superposed guiding channels $a$ and $f$ open at their rear and closed at their forward ends, said channels extending rearwardly to the walls $u$ in a manner to be closed thereby. To one of the side walls of said magazine there is pivotally mounted a bail $x$ provided with a crank $w$ for returning the plate holders from an exposed to an unexposed position.

As shown, three plate holders are provided, one arranged behind the other, the foremost plate holder $b$ being provided at one side with a trunnion 1 adapted to project into and be guided by the lower channel $a$. At its opposite end said plate holder $b$ is adapted to be engaged by a yieldingly acting pivotal mounting composed of a plunger 4 seated in a socket 2 adapted to be received in the lower channel $a$. Said plunger 4 is held in engagement with the holder $b$ by spring 3, said holder being provided with a recess 5 for the outer end of said plunger. By means of this construction the holder $b$ may be easily removed and inserted and is maintained against the opposite wall and in a definite focal position in the magazine. The socket 2 and the trunnion 1 engage the outer closed ends of the channel $a$ and thereby the forward movement of said holder $b$ is limited. The next rearmost holder $g$ is provided with pivotal mountings in all respects similar to the mountings of the first holder $b$ which mountings are guided by the channels $f$. The rearmost or third holder $q$ is likewise provided with mountings similar to holders $b$ and $g$, said mountings being guided by $a$. In order to enable the third holder $q$ to be advanced in the magazine to the same focal exposing position of holders $b$ and $g$, the said holder $q$, at its lower margin, is offset at $q'$ in a manner to overhang the pivotal mountings of the holders $b$ and $g$, when the latter are in exposing positions as shown in Fig. 2. It will be further noted by reference to this figure that the pivotal mountings of the holders $b$ and $g$ which have engaged the forward closed walls of the channels $a$ and $f$ form stops limiting the forward movement of the lower end of the holder $q$. Each of the holders $b$, $g$ and $q$ is provided with means for supporting and retaining the plates in position which means, as shown, consists of oppositely disposed guides $c$, $h$ and $r$ and interposed plate engaging springs $d$, $i$ and $s$. Said guides and springs are arranged upon the holders in parallel relation in a manner to permit the plates to be inserted and withdrawn laterally. In order to automatically advance the holders after they have been released so that they will fall by gravity into a lower or exposed position, each of the plates $g$ and $q$ is provided with advancing springs $k$ and $t$, the spring $k$ bearing against the holder $b$ and the spring $t$ against the holder $g$.

A combined retaining and releasing device is provided for releasing holders $b$ and $g$, one at a time, and for retaining the holder $q$. As shown, said device is located in the upper wall of said magazine in a manner to engage the margins of the plate holders at points opposite to their pivotal engagement with the channels $a$ and $f$. In the form shown, said device consists of a retaining lever $m$ pivoted at $m'$ and provided with a retaining extension $l$ adapted to project through the upper wall of the magazine into engaging proximity with the plate holders. Said lever is held in a retaining position by means of a spring $m^2$ secured at one end to any convenient stationary part and bearing at its free end upon said lever $m$. At its opposite end said lever $m$ is apertured and is adapted to be engaged by a shoulder $z'$ formed upon a plunger $z$ upon the upper end of which is mounted a bearing plate $p$. The lower reduced end $z^2$ of said plunger projects through the lever $m$ and into engagement with a lever $y$ pivoted at $y'$ to any convenient stationary part. Said lever $y$ extends forwardly from its pivotal mounting and is provided at its forward end with a stop projection $y^2$ adapted to project through the upper wall of the magazine into engaging proximity with the plate holders. A spring $y^3$ engages said lever $y$ and normally holds the same in a retracted position. A bearing plate $o$ secured to the upper wall of the magazine overhangs the bearing plate $p$ and there is interposed between said plates an expansion bulb $n$ operated by means of a tube $n'$ and a compression bulb $n^2$. It will be obvious, however, that the device may be operated manually.

The operation is as follows: When it is desired to load the magazine the rear wall $u$ is opened and the plate holders are inserted in their respective guide channels.
When the wall $u$ is closed the springs $v$ will engage the rearmost plate holder and acting therethrough will advance all of the holders to a forward position at which point the foremost holder is engaged at its upper margin by the retaining extension $l$ and at its lower margin by the closed forward end of the channel $a$. The bail $x$ will next be thrown downwardly into the position shown in Figs. 1 and 2. The holder $b$ is now in an exposing position and after the exposure is made the operator will compress the bulb $n^2$ expanding the bulb $n$ and forcing the plunger $z$ downwardly. This operation serves to lift the extension $l$ to release holder $b$ and simultaneously throws the projection $y$ into engaging position with the next rearmost holder $g$. When the extension $l$ is retracted to free the holder $b$ the spring $k$ will thrust the holder $b$ forwardly at its upper end causing the latter to descend by gravity upon its pivotal mounting to the position shown in Fig. 1. Assuming now that pressure on the bulb $n^2$ has been released the plunger $z$ will be restored to its normal position by the action of springs $m^2$ and $y^3$ thereby serving to lift the projection $y^2$ out of engagement with the plate $g$ and forcing the extension $l$ in the path of said plate. When said plate has been released by the stop projection $y^2$, the springs $v$ will advance the plates $q$ and $g$ forwardly to the position shown in Fig. 1. After the plate in holder $g$ has been exposed the bulb $n^2$ will be compressed and the same operation will release and advance the plate $g$ on its pivotal mounting and will force the plate holder $q$ into an exposing position as shown in Fig. 2. When all of the plates have been exposed the operator will return the holders $b$ and $g$ by means of the bail $x$.

I claim:—

1. A magazine provided with two sets of grooves, three plate holders each provided with guide elements projecting into said grooves in a manner to form a pivotal mounting for said holders, a centrally pivoted lever provided on one end with a catch for engaging a holder, a movable disk mounted on the other end of said lever, a fixed part overhanging said disk, an expansible bulb interposed between said fixed part and said disk, a tube and an operating bulb for said expansible bulb, means for preventing the holders with unexposed plates from tipping forwardly into non-exposing positions, means for returning the plate holders into the magazine to permit closing the same, means for retaining the third plate holder in one set of grooves, and means for permitting the removal of the plate holders from the magazines.

2. A magazine provided with two sets of grooves, three plate holders each provided with guide elements projecting into said grooves in a manner to form a pivotal mounting for said holders, a centrally pivoted lever provided on one end with a catch, a movable plate carried on the other end of said lever, a fixed part overhanging said movable plate, an expansible bulb interposed between said plate and fixed part, a tube and ball for expanding said bulb, pressure springs attached to the second and third plate holders, springs at the back of the magazine for engaging said rearmost plate holder, means for preventing holders of unexposed plates from tipping forwardly and downwardly, means for detachably securing the plates to said plate holders, means for retracting the forwardly tipped holders into the magazine, means for holding the third plate holder in one set of grooves, and means permitting the removal of the plate holder from the magazine.

3. A magazine provided with two sets of grooves, three plate holders each provided with guide elements projecting in said grooves in a manner to form a pivotal mounting for said holders, a centrally pivoted lever provided on one end with a catch, a movable plate carried by the other end of said lever, a fixed part overhanging said plate, an expansible bulb interposed between said plate and fixed part, a tube and ball for expanding said bulb, pressure springs attached to the second and third holders, springs on the back of the magazine engaging said rearmost holder, a second lever provided with a catch, a shouldered rod provided with a reduced end for said movable plate having its shoulder bearing on said centrally pivoted lever and its reduced end bearing on said last mentioned lever, means for detachably securing the plates to said holders, means for retracting the forwardly tipped holders into the magazine, means for retaining the third plate holder in one set of grooves, and means for permitting the removal of the plate holders from the magazine.

4. A magazine provided with two sets of grooves, three plate holders provided with guide elements adapted to project into said grooves in a manner to form a pivotal mounting for said holders, a centrally pivoted lever provided on one end with a catch, a second lever provided with a catch, a movable plate provided with a shouldered rod provided with a reduced portion, the shoulder thereof resting on said centrally pivoted lever and the reduced portion on said second lever, a fixed part overhanging said movable plate, an expansible bulb interposed between said plate and fixed part, a tube and pneumatic ball for operating said bulb, pressure springs for said second and third plate holders, springs at the rear of the magazine engaging the rearmost plate holder, off-set metal strips for said plate holders, springs between said strips, means for retracting the plate holders into the magazine, means for holding the third plate holder in one set of grooves, and means permitting the removal of the plate holders from the magazines.

5. A magazine provided with two sets of grooves, three plateholders provided with guide elements projecting into said grooves in a manner to form a pivotal mounting for said holders, a centrally pivoted lever provided on one end with a catch, a movable plate provided with a shouldered rod provided with a reduced end mounted on the other end of said lever the reduced end of said rod extending below the same a second lever provided with a catch and engaged by the reduced end of said rod, a fixed part overhanging said movable plate, an expansible bulb interposed between said plate and fixed part, a tube and pneumatic ball for operating said bulb, pressure springs for the second and third holders, springs at the rear of said magazine engaging said rearmost holder, off-set strips for said holders, springs between said strips, a lever for retracting the plate holders into the magazine, means for holding the third plate holder in one set of grooves, and means permitting the removal of the plate holder from the magazine.

6. A magazine provided with two sets of grooves, three plate holders provided with guide elements projecting into said grooves in a manner to form a pivotal mounting for said holders, a centrally pivoted lever provided at one end with a catch, a movable plate provided with a shouldered rod provided with a reduced portion the shoulder thereof resting on the other end of said lever and the reduced portion projecting below the same, a second lever provided with a catch and adapted to be engaged by the reduced portion of said rod, a fixed part overhanging said plate, an expansible bulb interposed between said fixed part and plate, a tube and pneumatic ball for operating said bulb, pressure springs for the second and third plate holders, springs at the rear of the magazine engaging said rearmost holder, off-set strips for the plate holders, springs between said strips, a spring actuated lever for retracting the holders into the magazine, means for holding the third plate holder in one set of grooves, and means permitting the removal of the plate holders from the magazine.

7. A magazine provided with two sets of grooves, three plate holders each provided with guide elements projecting into said grooves in a manner to form a pivotal mounting for said holders, a centrally pivoted lever provided on one end with a catch, a movable plate provided with a shouldered rod provided with a reduced portion the shoulder thereof resting on the opposite end of said centrally pivoted lever the reduced portion projecting below the same, a second lever provided with a catch, and adapted to be engaged by the reduced portion of said rod, a fixed part overhanging said plate, an expansible bulb interposed between plate and fixed part, a tube and pneumatic ball for operating said bulb, and means permitting the removal of the plate holders from the magazine.

8. A magazine provided with two sets of grooves, three plate holders each provided with guide elements projecting into said grooves in a manner to form a pivotal mounting for said holders, a centrally pivoted lever provided on one end with a catch, a movable plate provided with a shouldered rod provided with a reduced portion the shoulder thereof resting on the opposite end of said centrally pivoted lever the reduced portion projecting below the same, a second lever provided with a catch, and adapted to be engaged by the reduced portion of said rod, a fixed part overhanging said plate, an expansible bulb interposed between said plate and fixed part, a tube and pneumatic ball for operating said bulb, springs for the second and third plate holders and springs at the rear of the magazine for engaging the rearmost holder.

9. In combination a magazine, a plurality of plate-holders therefor, a separate retaining and releasing device for said holders comprising retaining and stop members, and pneumatic means for operating said members.

10. In combination a magazine, a plurality of plate-holders therefor, a separate releasing and retaining device for said holders comprising retaining and stop members, and a single element for operating said members.

11. In combination a magazine, a plurality of plate-holders therefor, a separate retaining and releasing device for said holders comprising retaining and stop members, a single element for operating said members, and pneumatic means operating said element.

12. In combination, a magazine, a plurality of plate holders therefor, and a combined retaining and releasing device comprising a pivotally mounted retaining member, a pivotally mounted stop member, and means engaging said members between the pivotal mountings thereof.

13. In combination, a magazine, a plurality of plate-holders therefor, a combined retaining and releasing device comprising a retaining member pivotally mounted between its ends, a stop member mounted at one end, and means engaging said retaining member rearwardly of its mounting, said means engaging the stop member forwardly of its mounting.

14. In combination, a magazine, a plurality of plate-holders therefor, and a combined retaining and releasing device comprising a retaining member and a stop member, a plunger reduced to form a shoulder adapted to engage said retaining member, the reduced portion of said plunger engaging said stop member, a bearing plate for said plunger, a stationary bearing plate overhanging said plunger bearing plate, an expansion bulb interposed between said plates, and a tube and compression bulb for operating said expansion bulb.

15. In combination, a magazine, a plurality of plate holders therefor, a combined retaining and releasing device for said holders, and intermediate means associated with said holders whereby one holder serves to eject an adjacent holder when the latter is released.

16. In combination, a magazine, a plurality of plate holders therefor, a combined retaining and releasing device for said holders, and intermediate springs for said holders serving to severally eject the same when released.

17. In combination, a magazine, a plurality of plate holders therefor, magazine springs for advancing said plate holders to a forward or exposing position, combined retaining and releasing means for said holders, and intermediate means associated with said holders for severally ejecting the same when released.

18. In combination, a magazine provided with a plurality of superposed guide grooves, a plurality of plate-holders for said magazine, and guiding elements for said holders located in said grooves, the guiding elements of said foremost holder being located in the lowermost groove, the guiding means of said second holder being located in the uppermost groove, the guiding elements of the next rearmost holder being located in the lower groove, said rearmost holder being offset to permit its advancement in the magazine to the focal or exposing position of said first two holders.

19. In combination, a magazine provided with guiding channels, a plurality of plate holders, a guiding element for one of said plate holders located in the channel of one side of said magazine, and yieldingly acting means for guiding the opposite side of said holder.

20. In combination, a magazine provided with guiding channels, a plate holder provided on one side with an element located in one of said channels, and a yieldingly acting guiding device for the remaining channel comprising a socket and a spring actuated plunger engaging said plate holder.

In testimony whereof I affix my signature in presence of two witnesses.

OTTO HERMANN WEICHEL.

Witnesses:
 HENRY HASPER,
 WOLDEMAR HAUPT.